(12) United States Patent
Ackelid et al.

(10) Patent No.: US 11,059,123 B2
(45) Date of Patent: Jul. 13, 2021

(54) ADDITIVE MANUFACTURING OF THREE-DIMENSIONAL ARTICLES

(71) Applicant: Arcam AB, Moelndal (SE)

(72) Inventors: Ulf Ackelid, Goeteborg (SE); Isak Elfstroem, Kungsbacka (SE)

(73) Assignee: Arcam AB, Moelndal (SE)

( * ) Notice: Subject to any disclaimer, the term of this patent is extended or adjusted under 35 U.S.C. 154(b) by 320 days.

(21) Appl. No.: 15/938,646

(22) Filed: Mar. 28, 2018

(65) Prior Publication Data

US 2018/0311759 A1    Nov. 1, 2018

Related U.S. Application Data

(60) Provisional application No. 62/491,459, filed on Apr. 28, 2017.

(51) Int. Cl.
*B23K 15/00* (2006.01)
*B33Y 10/00* (2015.01)
(Continued)

(52) U.S. Cl.
CPC .......... *B23K 15/0086* (2013.01); *B22F 12/00* (2021.01); *B23K 15/002* (2013.01);
(Continued)

(58) Field of Classification Search
CPC ............................................... B22F 2003/1056
See application file for complete search history.

(56) References Cited

U.S. PATENT DOCUMENTS 2,264,968 A    12/1941    De Forest
2,323,715 A     7/1943    Kuehni
(Continued)

FOREIGN PATENT DOCUMENTS

CA    2860188 A1    6/2006
CN    101607311 A   12/2009
(Continued)

OTHER PUBLICATIONS

Translation of DE-102011109411-A1 from Google Patents (Year: 2020).*
Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
Gibson, D.W., et al., "Additive Manufacturing Technologies: Rapid Prototyping to Direct Digital Manufacturing", 2010, pp. 126-129, Springer, New York.
(Continued)

*Primary Examiner* — Justin C Dodson
*Assistant Examiner* — William C. Gibson
(74) *Attorney, Agent, or Firm* — Dinsmore & Shohl LLP

(57) ABSTRACT

The present invention relates to an apparatus for forming a three-dimensional article through successively depositing individual layers of powder material that are fused together so as to form the article, the apparatus comprising an electron beam source emanating an electron beam for fusing the powder material in a build tank, a hollow construction having an upper opening and a lower opening, means for moving the hollow construction between a first position and a second position, a synchronising unit for synchronising the movement of a powder distributor for applying the individual layers of powder material on the work table with the movement of the hollow construction so that the hollow metal construction is at the first position when fusing and/or heating the powder layer and at the second position when the powder distributor is distributing the powder material for forming the individual powder layers.

16 Claims, 6 Drawing Sheets

(51) Int. Cl.
  *B33Y 30/00* (2015.01)
  *B33Y 50/02* (2015.01)
  *B23K 15/02* (2006.01)
  *B23K 15/06* (2006.01)
  *B29C 64/153* (2017.01)
  *B29C 64/264* (2017.01)
  *B22F 12/00* (2021.01)
  *B22F 10/10* (2021.01)

(52) U.S. Cl.
  CPC .......... *B23K 15/0026* (2013.01); *B23K 15/02* (2013.01); *B23K 15/06* (2013.01); *B29C 64/153* (2017.08); *B29C 64/264* (2017.08); *B22F 10/10* (2021.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 3,634,644 A | 1/1972 | Ogden et al. | |
| 3,838,496 A | 10/1974 | Kelly | |
| 3,882,477 A | 5/1975 | Mueller | |
| 3,906,229 A | 9/1975 | Demeester et al. | |
| 3,908,124 A | 9/1975 | Rose | |
| 4,314,134 A | 2/1982 | Schumacher et al. | |
| 4,348,576 A | 9/1982 | Anderl et al. | |
| 4,352,565 A | 10/1982 | Rowe et al. | |
| 4,401,719 A | 8/1983 | Kobayashi et al. | |
| 4,541,055 A | 9/1985 | Wolfe et al. | |
| 4,651,002 A | 3/1987 | Anno | |
| 4,818,562 A | 4/1989 | Arcella et al. | |
| 4,863,538 A | 9/1989 | Deckard | |
| 4,888,490 A | 12/1989 | Bass et al. | |
| 4,927,992 A | 5/1990 | Whitlow et al. | |
| 4,958,431 A | 9/1990 | Clark et al. | |
| 4,988,844 A | 1/1991 | Dietrich et al. | |
| 5,118,192 A | 6/1992 | Chen et al. | |
| 5,135,695 A | 8/1992 | Marcus | |
| 5,167,989 A | 12/1992 | Dudek et al. | |
| 5,182,170 A | 1/1993 | Marcus et al. | |
| 5,204,055 A | 4/1993 | Sachs et al. | |
| 5,247,560 A | 9/1993 | Hosokawa et al. | |
| 5,393,482 A | 2/1995 | Benda et al. | |
| 5,483,036 A | 1/1996 | Giedt et al. | |
| 5,508,489 A | 4/1996 | Benda et al. | |
| 5,511,103 A | 4/1996 | Hasegawa | |
| 5,595,670 A | 1/1997 | Mombo Caristan | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,204,469 B1 | 3/2001 | Fields et al. | |
| 6,419,203 B1 | 7/2002 | Dang | |
| 6,537,052 B1 | 3/2003 | Adler | |
| 6,554,600 B1 | 4/2003 | Hofmann et al. | |
| 6,583,379 B1 | 6/2003 | Meiners et al. | |
| 6,676,892 B2 | 1/2004 | Das et al. | |
| 6,724,001 B1 | 4/2004 | Pinckney et al. | |
| 6,746,506 B2 | 6/2004 | Liu et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,452,500 B2 | 11/2008 | Uckelmann | |
| 7,454,262 B2 | 11/2008 | Larsson et al. | |
| 7,537,722 B2 | 5/2009 | Andersson et al. | |
| 7,540,738 B2 | 6/2009 | Larsson et al. | |
| 7,569,174 B2 | 8/2009 | Ruatta et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,754,135 B2 | 7/2010 | Abe et al. | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Montero-Escuder et al. | |
| 8,137,739 B2 | 3/2012 | Philippi et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 * | 9/2015 | Ljungblad ............... | B22F 3/004 |
| 9,254,535 B2 | 2/2016 | Buller et al. | |
| 9,310,188 B2 | 4/2016 | Snis | |
| 9,505,172 B2 | 11/2016 | Ljungblad | |
| 9,550,207 B2 | 1/2017 | Ackelid | |
| 9,597,730 B2 * | 3/2017 | Mironets ............... | B23K 26/342 |
| 9,802,253 B2 | 10/2017 | Jonasson | |
| 9,950,367 B2 | 4/2018 | Backlund et al. | |
| 10,071,422 B2 | 9/2018 | Buller et al. | |
| 2002/0104973 A1 | 8/2002 | Kerekes | |
| 2002/0152002 A1 | 10/2002 | Lindemann et al. | |
| 2002/0195747 A1 | 12/2002 | Hull et al. | |
| 2003/0043360 A1 | 3/2003 | Farnworth | |
| 2003/0133822 A1 | 7/2003 | Harryson | |
| 2003/0205851 A1 | 11/2003 | Laschutza et al. | |
| 2004/0012124 A1 | 1/2004 | Li et al. | |
| 2004/0026807 A1 | 2/2004 | Andersson et al. | |
| 2004/0084814 A1 | 5/2004 | Boyd et al. | |
| 2004/0104499 A1 | 6/2004 | Keller | |
| 2004/0148048 A1 | 7/2004 | Farnworth | |
| 2004/0173496 A1 | 9/2004 | Srinivasan | |
| 2004/0173946 A1 | 9/2004 | Pfeifer et al. | |
| 2004/0204765 A1 | 10/2004 | Fenning et al. | |
| 2004/0217095 A1 | 11/2004 | Herzog | |
| 2005/0173380 A1 | 8/2005 | Carbone | |
| 2005/0186538 A1 | 8/2005 | Uckelmann | |
| 2005/0282300 A1 | 12/2005 | Yun et al. | |
| 2006/0108712 A1 | 5/2006 | Mattes | |
| 2006/0138325 A1 | 6/2006 | Choi | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0074659 A1 | 4/2007 | Wahlstrom | |
| 2007/0175875 A1 | 8/2007 | Uckelmann et al. | |
| 2007/0179655 A1 | 8/2007 | Farnworth | |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2009/0206056 A1 | 8/2009 | Xu et al. | |
| 2010/0007062 A1 | 1/2010 | Larsson et al. | |
| 2010/0260410 A1 | 10/2010 | Taminger et al. | |
| 2010/0305743 A1 | 12/2010 | Larsson | |
| 2010/0310404 A1 | 12/2010 | Ackelid | |
| 2010/0316856 A1 | 12/2010 | Currie et al. | |
| 2011/0061591 A1 | 3/2011 | Stecker | |
| 2011/0114839 A1 | 5/2011 | Stecker et al. | |
| 2011/0133367 A1 | 6/2011 | Weidinger et al. | |
| 2011/0240607 A1 | 10/2011 | Stecker et al. | |
| 2011/0241575 A1 | 10/2011 | Caiafa et al. | |
| 2011/0293770 A1 | 12/2011 | Ackelid et al. | |
| 2011/0293771 A1 | 12/2011 | Oberhofer et al. | |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0164322 A1 | 6/2012 | Teulet et al. | |
| 2012/0183701 A1 | 7/2012 | Pilz et al. | |
| 2012/0193530 A1 | 8/2012 | Parker et al. | |

(56) References Cited

U.S. PATENT DOCUMENTS

| | | |
|---|---|---|
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0054191 A1 | 2/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 * | 6/2015 | Elfstroem .......... B23K 15/0086 219/121.14 |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | | |
|---|---|---|---|
| CN | 101635210 A | 1/2010 | |
| CN | 201693176 U | 1/2011 | |
| CN | 101607311 B | 9/2011 | |
| CN | 203509463 U | 4/2014 | |
| DE | 19952998 A1 | 5/2001 | |
| DE | 20305843 U1 | 7/2003 | |
| DE | 10235434 A1 | 2/2004 | |
| DE | 102005014483 A1 | 10/2006 | |
| DE | 202008005417 U1 | 8/2008 | |
| DE | 102007018601 A1 | 10/2008 | |
| DE | 102007029052 A1 | 1/2009 | |
| DE | 102008012064 A1 | 9/2009 | |
| DE | 102010041284 A1 | 3/2012 | |
| DE | 102011105045 B3 | 6/2012 | |
| DE | 102011109411 A1 | 2/2013 | |
| DE | 102011109411 A1 * | 2/2013 | .......... B29C 64/153 |
| DE | 102013210242 A1 | 12/2014 | |
| EP | 0289116 A1 | 11/1988 | |
| EP | 0322257 A2 | 6/1989 | |
| EP | 0688262 A1 | 12/1995 | |
| EP | 1358994 A1 | 11/2003 | |
| EP | 1418013 A1 | 5/2004 | |
| EP | 1466718 A2 | 10/2004 | |
| EP | 1486318 A2 | 12/2004 | |
| EP | 1669143 A1 | 6/2006 | |
| EP | 1683593 A2 | 7/2006 | |
| EP | 1721725 A1 | 11/2006 | |
| EP | 1752240 A1 | 2/2007 | |
| EP | 1952932 A2 | 8/2008 | |
| EP | 2011631 A1 | 1/2009 | |
| EP | 2119530 A1 | 11/2009 | |
| EP | 2281677 A1 | 2/2011 | |
| EP | 2289652 A1 | 3/2011 | |
| EP | 2292357 A1 | 3/2011 | |
| EP | 2832474 A1 | 2/2015 | |
| EP | 3248716 A1 * | 11/2017 | ......... B23K 15/0086 |
| EP | 3248716 A1 | 11/2017 | |
| EP | 3248717 A1 | 11/2017 | |
| FR | 2980380 A1 | 3/2013 | |
| JE | 102013215377 A1 | 2/2015 | |
| JP | H05-171423 A | 7/1993 | |
| JP | 2003241394 A | 8/2003 | |
| JP | 2003245981 | 9/2003 | |
| JP | 2009006509 A | 1/2009 | |
| SE | 524467 C2 | 8/2004 | |
| WO | WO 1993/08928 A1 | 5/1993 | |
| WO | WO 1996/012607 A1 | 5/1996 | |
| WO | WO 1997/37523 A2 | 10/1997 | |
| WO | WO 2001/081031 A1 | 11/2001 | |
| WO | WO 2001/85386 A2 | 11/2001 | |
| WO | WO 2002/008653 A1 | 1/2002 | |
| WO | WO 2004/007124 A1 | 1/2004 | |
| WO | WO 2004/043680 A2 | 5/2004 | |
| WO | WO 2004/054743 A1 | 7/2004 | |
| WO | WO 2004/056511 A1 | 7/2004 | |
| WO | WO 2004/106041 A2 | 12/2004 | |
| WO | WO 2004/108398 A1 | 12/2004 | |
| WO | WO 2006/091097 A2 | 8/2006 | |
| WO | WO 2006/121374 A1 | 11/2006 | |
| WO | WO 2007/112808 A1 | 10/2007 | |
| WO | WO 2007/147221 A1 | 12/2007 | |
| WO | WO 2008/013483 A1 | 1/2008 | |
| WO | WO 2008/057844 A1 | 5/2008 | |
| WO | WO 2008/074287 A1 | 6/2008 | |
| WO | WO 2008/125497 A1 | 10/2008 | |
| WO | WO 2008/147306 A1 | 12/2008 | |
| WO | WO 2009/000360 A1 | 12/2008 | |
| WO | WO 2009/072935 A1 | 6/2009 | |

(56) References Cited

FOREIGN PATENT DOCUMENTS

| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

Klassen, Alexander, et al., "Modelling of Electron Beam Absorption in Complex Geometries", *Journal of Physics D: Applied Physics*, Jan. 15, 2014, 12 pages, vol. 47, No. 6, Institute of Physics Publishing Ltd., Great Britain.

Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.

Weigel, T.H., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

International Search Report and Written Opinion pertaining to Application No. PCT/EP2018/060575 filed Apr. 25, 2018 (13 pages).

European office action for application 18720231.2 dated Sep. 14, 2020 (10 pages).

\* cited by examiner

ADDITIVE MANUFACTURING OF THREE-DIMENSIONAL ARTICLES

CROSS-REFERENCE TO RELATED APPLICATIONS

This application claims priority to and the benefit of U.S. Provisional Patent Application Ser. No. 62/491,459, filed Apr. 28, 2017, the contents of which as are hereby incorporated by reference in their entirety.

BACKGROUND

Related Field

The present invention relates to a method and apparatus for additive manufacturing of a three dimensional article by successively fusing individual layers of powder material.

Description of Related Art

Freeform fabrication or additive manufacturing is a method for forming three-dimensional articles through successive fusion of chosen parts of powder layers applied to a worktable. A method and apparatus according to this technique is disclosed in U.S. Pat. No. 7,713,454.

An additive manufacturing apparatus according to prior art may comprise a work table on which the three-dimensional article is to be formed, a powder dispenser or powder distributor, arranged to lay down a thin layer of powder on the work table for the formation of a powder bed, a high energy beam for delivering energy to the powder whereby fusion of the powder takes place, elements for control of the energy given off by the energy beam over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

The apparatus may further comprise a so-called heat shield in the form of a hollow metal construction 110. The hollow metal construction 110, arranged between the electron beam source and the build tank, having an upper opening 170 and a lower opening 180, wherein the lower opening 180 is enclosing the work table 150 within a build tank 140 and where the upper opening 170 is arranged for receiving the electron beam 190. The upper and lower opening may have a rectangular shape. The heat shield 110 further comprises a first and second flaps 130a, 130b for allowing the powder distributor to pass under the heat shield 110 while at the same time partially shielding the surrounding inside of the additive manufacturing apparatus from heat radiation and/or metal vapour. The flaps 130a, 130b are hinged onto the hollow metal construction 110 and tiltable in a forward or backward direction, where only one direction is depicted in FIG. 1 with a dashed flap 130a', 130b'. The flaps may arranged onto the heat shield essentially in parallel with the powder distributor 120.

The heat shield is arranged for shielding the surrounding vacuum chamber from metallization and heat radiation.

There is a problem with the current heat shield since it is leaking both heat and metallization.

BRIEF SUMMARY

An object of the invention is to provide a method and apparatus which reduces the leakage of metallization and/or heat from the heat shield in an additive manufacturing process.

The above mentioned object is achieved by the features in the method according to the pending claims provided herein.

In a first aspect of the invention it is provided an apparatus for forming a three-dimensional article through successively depositing individual layers of powder material that are fused together so as to form the article in a vacuum chamber, the apparatus comprising an electron beam source emanating an electron beam for fusing the powder material in a build tank, the apparatus further comprising a hollow construction arranged between the electron beam source and the build tank, the hollow construction having an upper opening and a lower opening, wherein the lower opening surrounds a work table within the build tank and where the upper opening is arranged for receiving the electron beam, the apparatus further comprising means for moving the hollow construction between a first position and a second position where the first and second positions are at different distances with respect to a top surface of a powder table arranged outside the build tank, a synchronising unit for synchronising the movement of a powder distributor for applying the individual layers of powder material on the work table with the movement of the hollow construction so that the hollow metal construction is at the first position when fusing and/or heating the powder layer and at the second position when the powder distributor is distributing the powder material for forming the individual layers which is to be fused for forming the three dimensional article, wherein the powder distributor can only pass under the hollow construction when the hollow construction is in its second position.

An exemplary advantage of various example embodiments of the present invention is that metallization and/or heat radiation may be eliminated or at least very much reduced compared to the prior art solution.

In another example embodiment of the present invention the lower opening is at about the same level as the top surface of a powder table arranged outside the build tank when the hollow construction is in the first position. An exemplary advantage of at least this embodiment is that the lower opening of the hollow construction and the powder table may in contact with each other keeping the metallization and or heat radiation to a minimum.

In yet another example embodiment the apparatus further comprising means for lowering the work table so that the top surface of the powder layer in the build tank is arranged at a predetermined distance below the top surface of the powder table when the powder layer is fused and/or heated in the build tank. An exemplary advantage of at least this embodiment is that the build tank may function as a further barrier for heat radiation and/or metallization if the melting and/or heating is performed when the work table is lowered down into the build tank.

In still another example embodiment of the present invention the apparatus further comprising a movable shielding means enclosing the work table, the movable shielding means is arranged movable between a first and a second position, where the movable shielding means is lowered down into the powder table when in the first position and protruding from the powder table when in the second position. An exemplary advantage of at least this embodiment is that the shielding means may function as a further barrier for heat radiation and/or metallization if the melting and/or heating is performed when the shielding means is protruding from the powder table.

In still another example embodiment of the present invention the movement of the metal hollow construction and the shielding means may be triggered by the movement of the powder distributor so that as soon as the powder distributor is moving the hollow metal construction and the shielding means are set in the second position and when the powder distributor is standing still the hollow metal construction and the shielding means are set in the first position. An exemplary advantage of at least this embodiment is that the control of the movement of the hollow construction and/or the shielding means may be very simple.

In another aspect of the present invention it is provided a method for forming a three-dimensional article through successively depositing individual layers of powder material that are fused together so as to form the article in a vacuum chamber, the method comprising the steps of: providing an electron beam source emanating an electron beam for fusing the powder material in a build tank; providing a movable hollow construction having an upper opening and a lower opening, wherein the lower opening is enclosing the a work table within the build tank and where the upper opening is arranged for receiving the electron beam; moving the hollow construction between a first position and a second position where the first and second positions are at different distances with respect to a top surface of a powder table; synchronising the movement of a powder distributor for applying the individual layers of powder material on the work table with the movement of the hollow construction by means of a synchronising unit so that the hollow construction is at the first position when fusing and/or heating the powder layer and at the second position when the powder distributor is distributing the powder material for forming the individual layers which is to be fused for forming the three-dimensional article; and allowing the powder distributor to pass under the hollow construction only when the hollow construction is in its second position.

According to another aspect of the present invention it is provided a program element configured and arranged when executed on a computer to implement a method for forming a three-dimensional article through successively depositing individual layers of powder material that are fused together so as to form the article in a vacuum chamber, the method comprising the steps of: moving a hollow construction between a first position and a second position where the first and second positions are at different distances with respect to a top surface of a powder table; synchronising the movement of a powder distributor for applying the individual layers of powder material on the work table with the movement of the hollow construction by means of a synchronising unit so that the hollow construction is at the first position when fusing and/or heating the powder layer and at the second position when the powder distributor is distributing the powder material for forming the individual layers which is to be fused for forming the three-dimensional article.

According to still another aspect of the present invention A non-transitory computer program product comprising at least one non-transitory computer-readable storage medium having computer-readable program code portions embodied therein, the computer-readable program code portions comprising: an executable portion configured for moving a hollow metal construction between a first position and a second position where the first and second positions are at different distances with respect to a top surface of a powder table; and an executable portion configured for synchronising the movement of a powder distributor for applying the individual layers of powder material on the work table with the movement of the hollow metal construction by means of a synchronising unit so that the hollow metal construction is at the first position when fusing and/or heating the powder layer and at the second position when the powder distributor is distributing the powder material for forming the individual layers which is to be fused for forming the three-dimensional article.

Further exemplary advantages of the present invention may be apparent from the figures and the various embodiments disclosed herein below.

All examples and exemplary embodiments described herein are non-limiting in nature and thus should not be construed as limiting the scope of the invention described herein. Still further, the advantages described herein, even where identified with respect to a particular exemplary embodiment, should not be necessarily construed in such a limiting fashion.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1F-1G depict a cross sectional side view of a third example embodiment of a build tank with a movable hollow construction;

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 2:
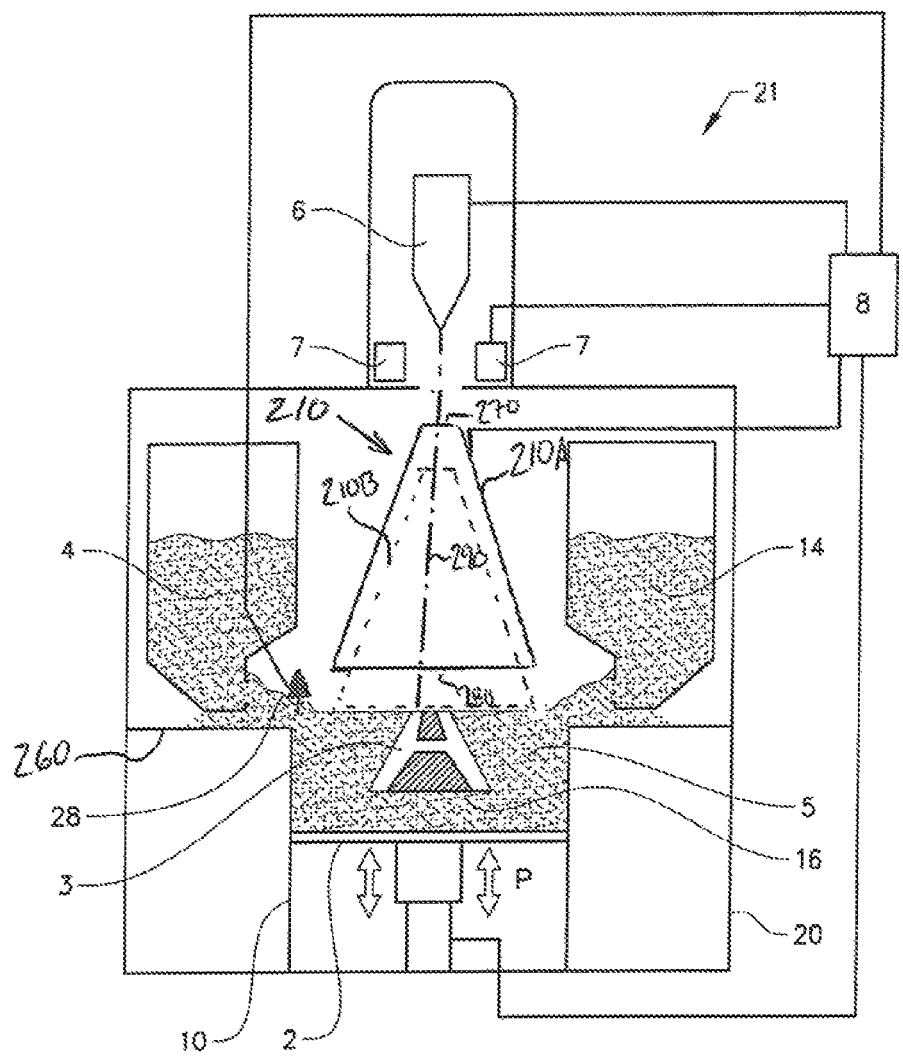
FIG. 2 depicts, in a schematic view, an apparatus for producing a three-dimensional product according to prior art.

FIG. 2 depicts an embodiment of a freeform fabrication or additive manufacturing apparatus 21 in which various embodiments of the present invention may be implemented.

The apparatus 21 comprising an electron beam gun 6; deflection coils 7; two powder hoppers 4, 14; a build platform 2; a build tank 10; a powder distributor 28; a powder bed 5; a control unit 8; a movable hollow construction 210A; and a vacuum chamber 20.

The vacuum chamber 20 is capable of maintaining a vacuum environment by means of or via a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam 290 which is used for melting or fusing together powder material 5 provided on the build platform 2. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to the control unit 8. In an example embodiment of the invention the electron beam gun 6 generates a focusable electron beam with an accelerating voltage of about 15-60 kV and with a beam power in the range of 3-10 Kw. The pressure in the vacuum chamber may be $1 \times 10^{-3}$ mbar or lower when building the three-dimensional article 3 by fusing the powder layer by layer with the electron beam 290.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based superalloys, etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws, etc. The servo engine may be connected to the control unit 8.

An electron beam 290 may be directed over the build platform 2 causing the first powder layer to fuse in selected locations to form a first cross section of the three-dimensional article 3. The beam is directed over the build platform 2 from instructions given by the control unit 8. In the control unit 8 instructions for how to control the electron beam for each layer of the three-dimensional article 3 is stored. The first layer of the three dimensional article 3 may be built on the build platform 2, which may be removable, in the powder bed 5 or on an optional start plate 16. The start plate 16 may be arranged directly on the build platform 2 or on top of a powder bed 5 which is provided on the build platform 2.

After a first layer is finished, i.e., the fusion of powder material for making a first layer of the three-dimensional article, a second powder layer is provided on the build platform 2. The second powder layer is in certain embodiments preferably distributed according to the same manner as the previous layer. However, there might be alternative methods in the same additive manufacturing machine for distributing powder onto the work table. For instance, a first layer may be provided via or by means of a first powder distributor 28, a second layer may be provided by another powder distributor. The design of the powder distributor is automatically changed according to instructions from the control unit 8. A powder distributor 28 in the form of a single rake system, i.e., where one rake is catching powder fallen down from both a left powder hopper 4 and a right powder hopper 14, the rake as such can change design.

After having distributed the second powder layer on the build platform, the energy beam is directed over the work table causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

In the case where an electron beam is used, it is necessary to consider the charge distribution that is created in the powder as the electrons hit the powder bed 5. The charge distribution density depends on the following parameters: beam current, electron velocity (which is given by the accelerating voltage), beam scanning velocity, powder material and electrical conductivity of the powder, i.e., mainly the electrical conductivity between the powder grains. The latter is in turn a function of several parameters, such as temperature, degree of sintering and powder grain size/size distribution.

Thus, for a given powder, i.e., a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during a pre-heating process. When the conductivity has become sufficiently high, the powder can be fused together, i.e., melted or fully sintered, with predetermined values of the beam current and beam scanning velocity.

The moveable hollow construction 210 may be made of metal or ceramic material or any combination thereof. The movable hollow construction 210 is arranged between the electron beam source 6 and the powder table 260. An upper opening 270 of the movable hollow construction 210 is arranged for receiving the electron beam 290. A lower opening is arranged for surrounding the work table 2 in the build tank. The movable hollow construction 210 is movable between a first and second position. The dashed lined hollow construction 210B denotes a first position, whereas the solid lined hollow construction 210A denoted a second position. The movement of the hollow construction 210 is controlled by the control unit 8.

Figure 1A:
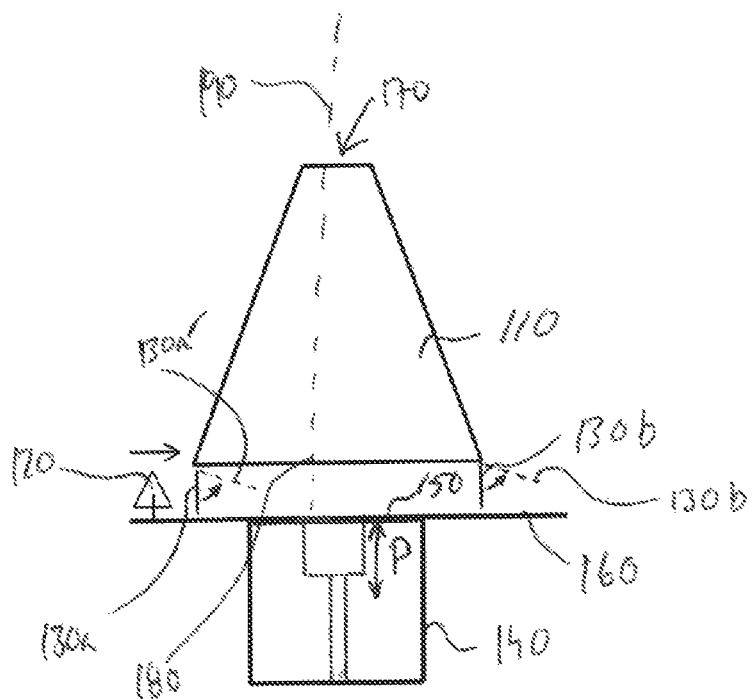
FIG. 1A depicts a cross sectional side view of a prior art build tank together and prior art heat shield.
Figure 1B:
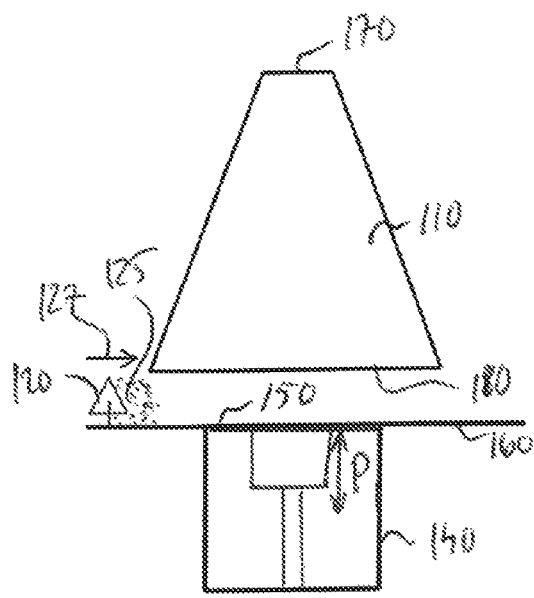
FIG. 1B-1C depict a cross sectional side view of a first example embodiment of a build tank with a movable hollow construction.
Figure 1C:
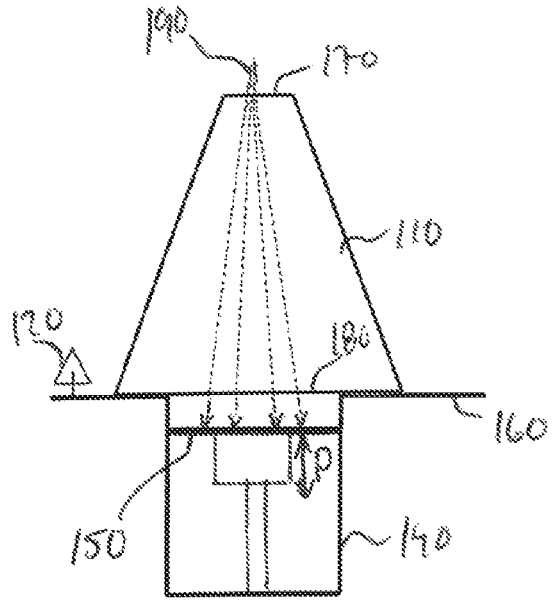
Figure 1B:
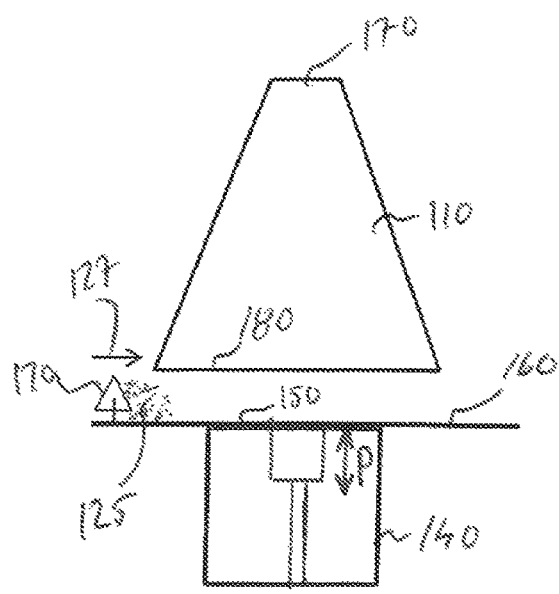
Figure 1C:
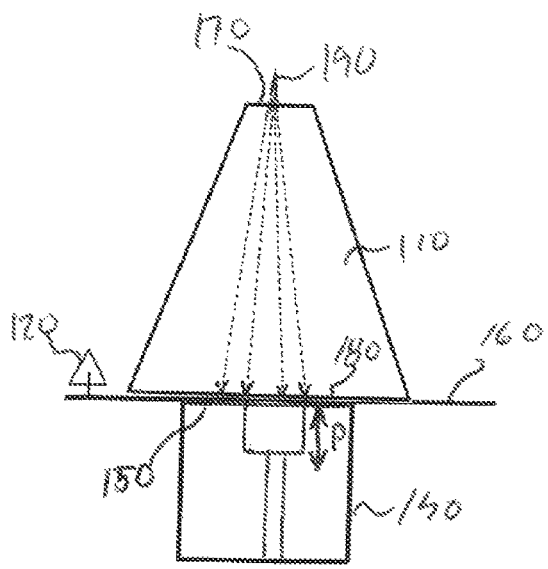

FIG. 1B-1C depict a cross sectional side view of a first example embodiment of a build tank 140 with a movable hollow construction 110. The build tank 140 comprises a build platform 150, which is movable up and down according to the arrow P, and a powder distributor 120. The build platform 150 inside the build tank 140 may have any desirable shape such as rectangular or circular. In FIG. 1A the powder distributor 120 is to apply a new powder layer on the build platform by distributing the powder 125 in front of the powder distributor 120 which is moving in the direction given by the arrow 127. The build platform 150 is provided at a predetermined distance below the powder table 160, which predetermined distance will define the thickness of the powder layer which is to be distributed onto the build platform 150. The powder table 160 is arranged outside the build tank 140 in all directions.

In FIG. 1B the hollow construction 110 is in its second position allowing the powder distributor 120 to pass below the hollow construction for distributing the powder material 125 to form a new powder layer. The second position of the hollow construction 110 may arrange the lower opening 180 of the hollow metal construction 110 at a distance from the powder table 160 which is slightly larger than the height of the powder distributor 120. The hollow construction 110 may be set to its second position as soon as the powder distributor 120 is moving, meaning that the hollow construction 110 will be set to the first position when the powder distributor 120 is standing still. Alternatively the hollow construction is set to the second position when the powder distributor is moving towards the hollow construction and is provided at a first predetermined distance from the hollow construction 110. The hollow construction will be set to the second position for all positions of the powder distributor below the hollow construction and at the first predetermined distance ahead and a second predetermined distance behind the hollow construction. The hollow construction will be set to the first position when the powder distributor is moving from the hollow construction and the distance from the powder distributor and the hollow construction is larger than the second predetermined distance. The hollow metal construction will be in its first position for all positions of the powder distributor which is larger away from the hollow construction than the first and second predetermined distances. The first and second predetermined distance may be equal or different to each other.

In FIG. 1B the hollow construction 110 is set in the first position while the electron beam 190 is heating and/or fusing the powder layer on top of the work table 150. The lower opening of the hollow construction may be very close to or in contact with the powder table 160 meaning that very little or no heat radiation and/or metal vapor may escape from outside the hollow construction and contaminate the inside of the vacuum chamber and/or the powder material which has not yet been distributed. The hollow construction may have a variety of shapes. In an example embodiment, the upper opening is considerably smaller than the lower opening. The upper and lower opening may have similar shapes. In an example embodiment, the shape of the upper and lower opening may be rectangular. The material of the hollow construction may be sheet metal. Alternatively the hollow construction is made of a ceramic material with thin walls, less than 1 cm. In yet an alternative embodiment the hollow construction may be a metal sheet construction which may be coated or covered with a ceramic material on the outside. In still an alternative embodiment the hollow construction may be a frame construction covered by a flexible metal carpet made of thin metal wires.

Figure 1D:
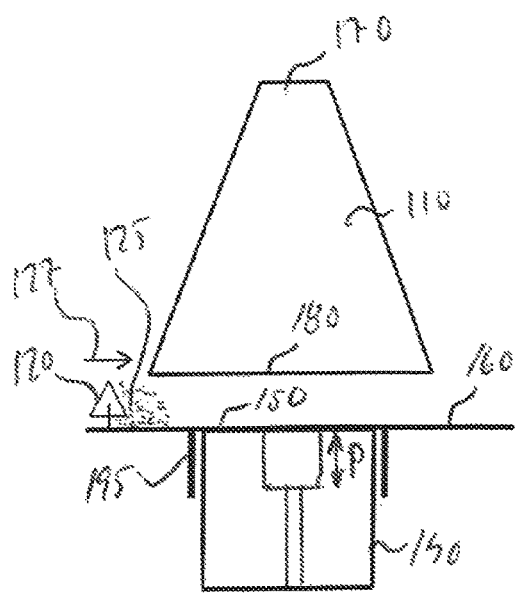
FIG. 1D-1E depict a cross sectional side view of a second example embodiment of a build tank with a movable hollow construction.
Figure 1E:
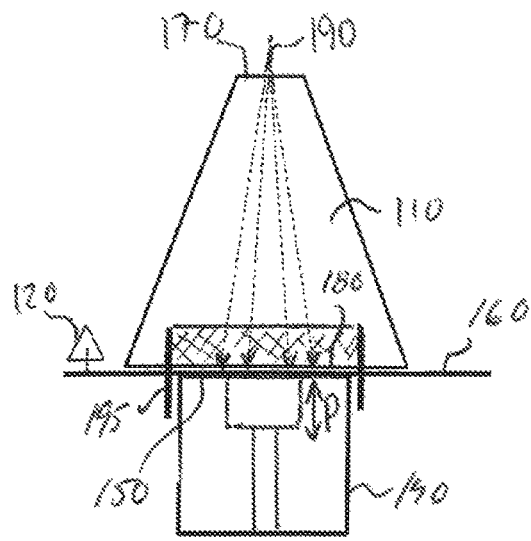

FIG. 1D-1E depict a cross sectional view of a second example embodiment of a build tank 140 with a movable hollow construction 110. FIG. 1D is identical to FIG. 1B and need no further clarification.

FIG. 1E illustrates in addition to what is disclosed in FIG. 1C that not only the movable hollow construction 110 is set in its first position when the electron beam is heating and/or melting the powder material but also the work table 150 is lowered down into the build tank 140 during heating and/or melting of the powder material. The uppermost part of the build tank will form as a shield for heat radiation and/or metal vapor together with the movable hollow construction for heat insulation and prohibiting of metallization of internal parts of the vacuum chamber and/or not yet distributed powder material. The distance the top surface of the powder layer which is to be melted is lowered in relation to the powder table may be a few mm or a few cm.

FIG. 1E-1F depict a cross sectional view of a third example embodiment of a build tank 140 with a movable hollow construction 110.

FIG. 1E is identical to FIG. 1B with the exception that it also comprises a movable shielding means 195. The movable shielding means is arranged to be movable between a first and a second position. When the powder distribution is taking place, the movable shielding means 195 is lowered down into the powder table 160 and set to its second position, thereby allowing the powder distributor 120 together with the powder 125 which is to form the new powder layer may freely pass over the movable shielding means without interruption as illustrated in FIG. 1F. The movable hollow construction 110 and the movable shielding means 195 may be synchronized to each other so that when the movable hollow construction 110 is set in its second position the movable shielding means is also set into its second position.

In FIG. 1G the movable hollow construction 110 is set in its first position when the electron beam is heating and/or melting the powder material but also a movable shielding means 195 is set to its first position. When the movable shielding means 195 is set into its first position it is protruding from the powder table 160 and acts as an additional protection for metallization and/or heat radiation out from the build tank. The movable shielding means 195 is in the illustrated example embodiment arranged in between the work table 150 and the lower opening 180 of the movable hollow construction 110. Alternatively, the movable shielding means 195 may be arranged outside the lower opening of the movable hollow construction. The movable shielding means may be made of metal material or ceramic material or any combination thereof. The thickness of the movable shielding means may be 0.5-1 cm. The shape of the movable shielding means may be circular or rectangular, meaning that the circular shaped or rectangular shaped movable shielding means 195 will surround the build tank and act as a wall or collar when in its first position for additional heat and/or metallization barrier.

In another aspect of the invention it is provided a program element configured and arranged when executed on a computer to implement a method for forming a three-dimensional article through successively depositing individual layers of powder material that are fused together so as to form the article. The program may be installed in a computer readable storage medium. The computer readable storage medium may be the control unit 8 described elsewhere herein or another separate and distinct control unit, or another comparable device, as desirable and well-known. The computer readable storage medium and the program element, which may comprise computer-readable program code portions embodied therein, may further be contained within a non-transitory computer program product. Further details in this regard are provided elsewhere herein.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 3:
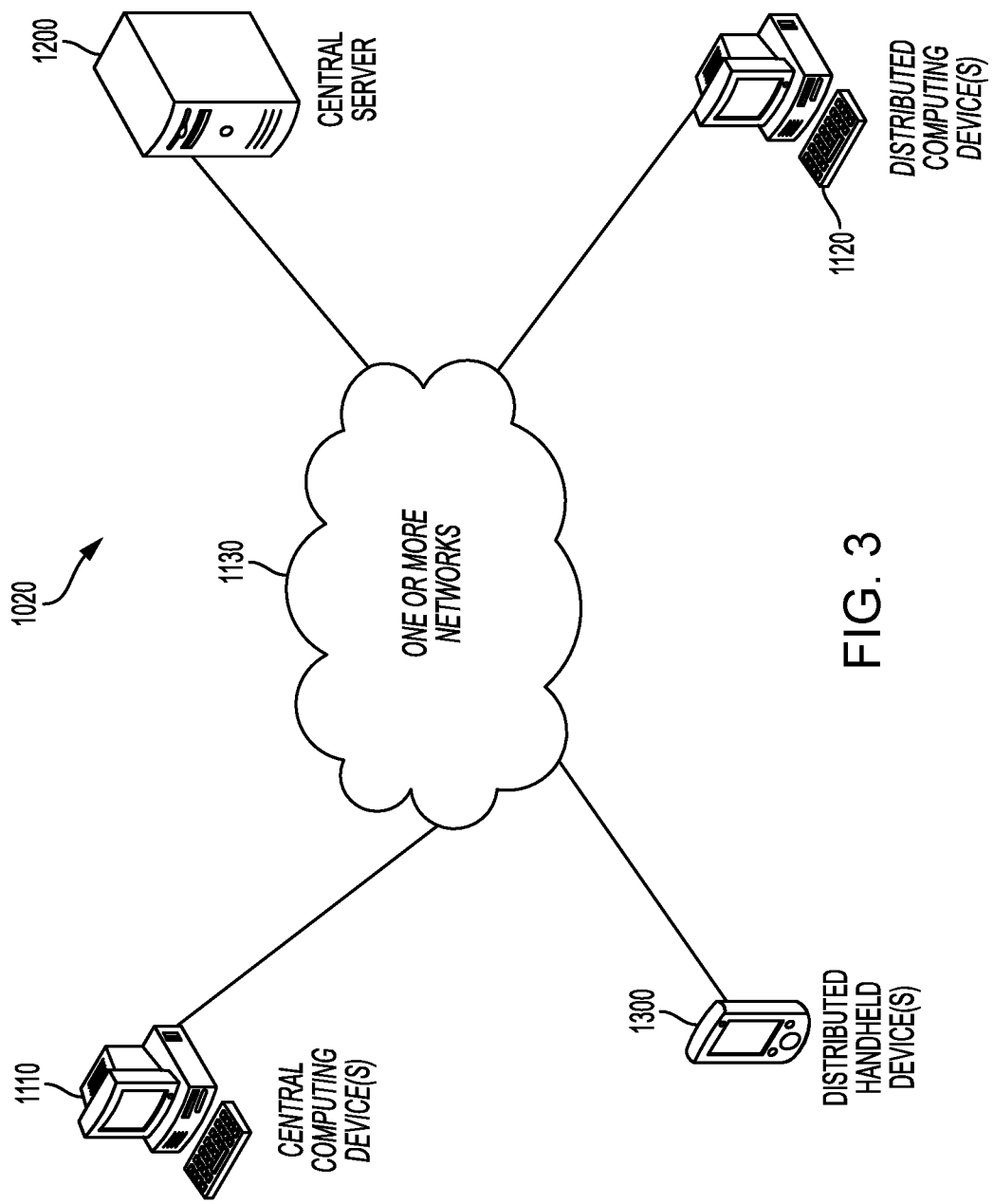
FIG. 3 is a block diagram of an exemplary system 1020 according to various embodiments.

FIG. 3 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 3 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 3 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 4A:
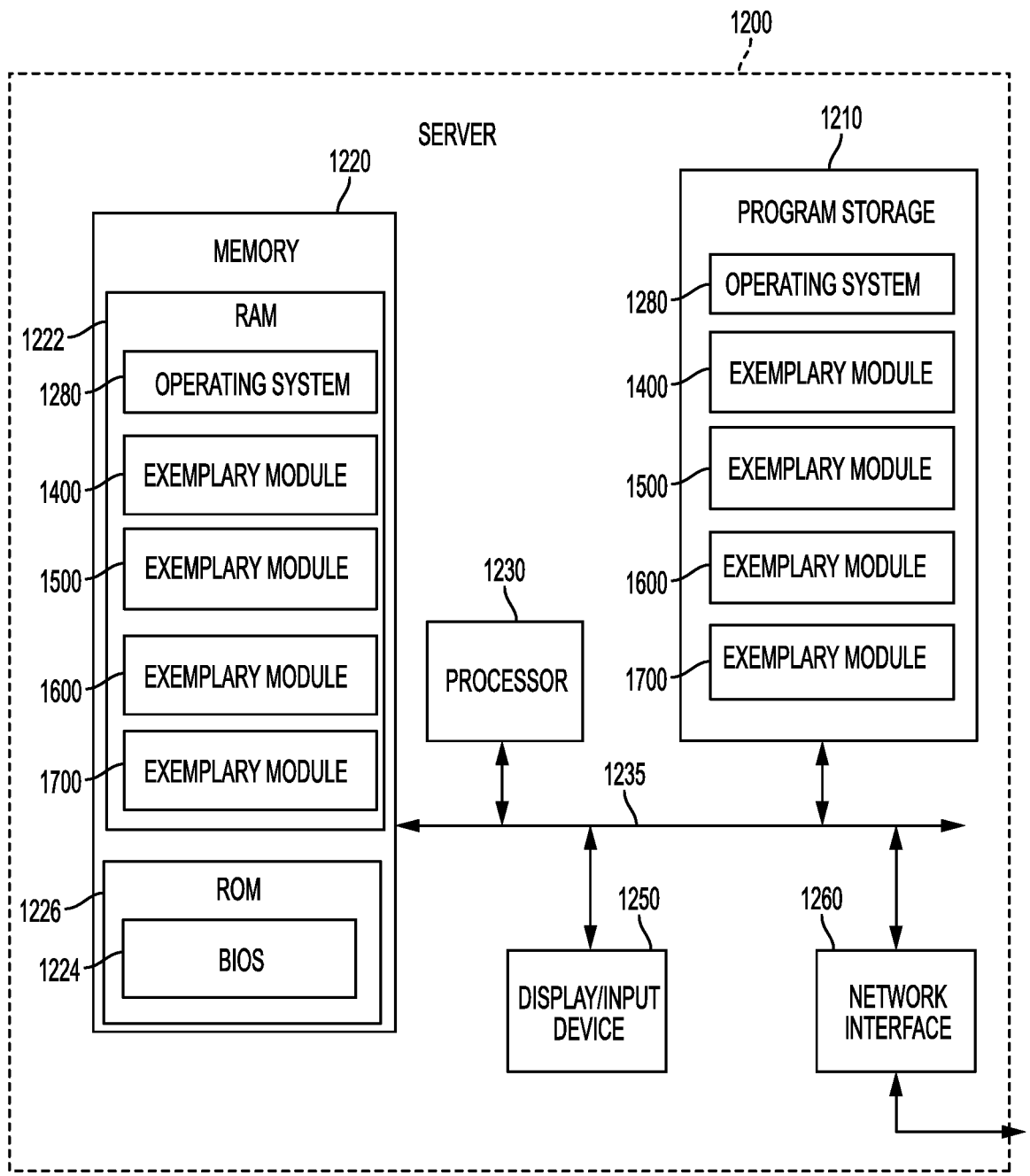
FIG. 4A is a schematic block diagram of a server 1200 according to various embodiments.

FIG. 4A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 4B:
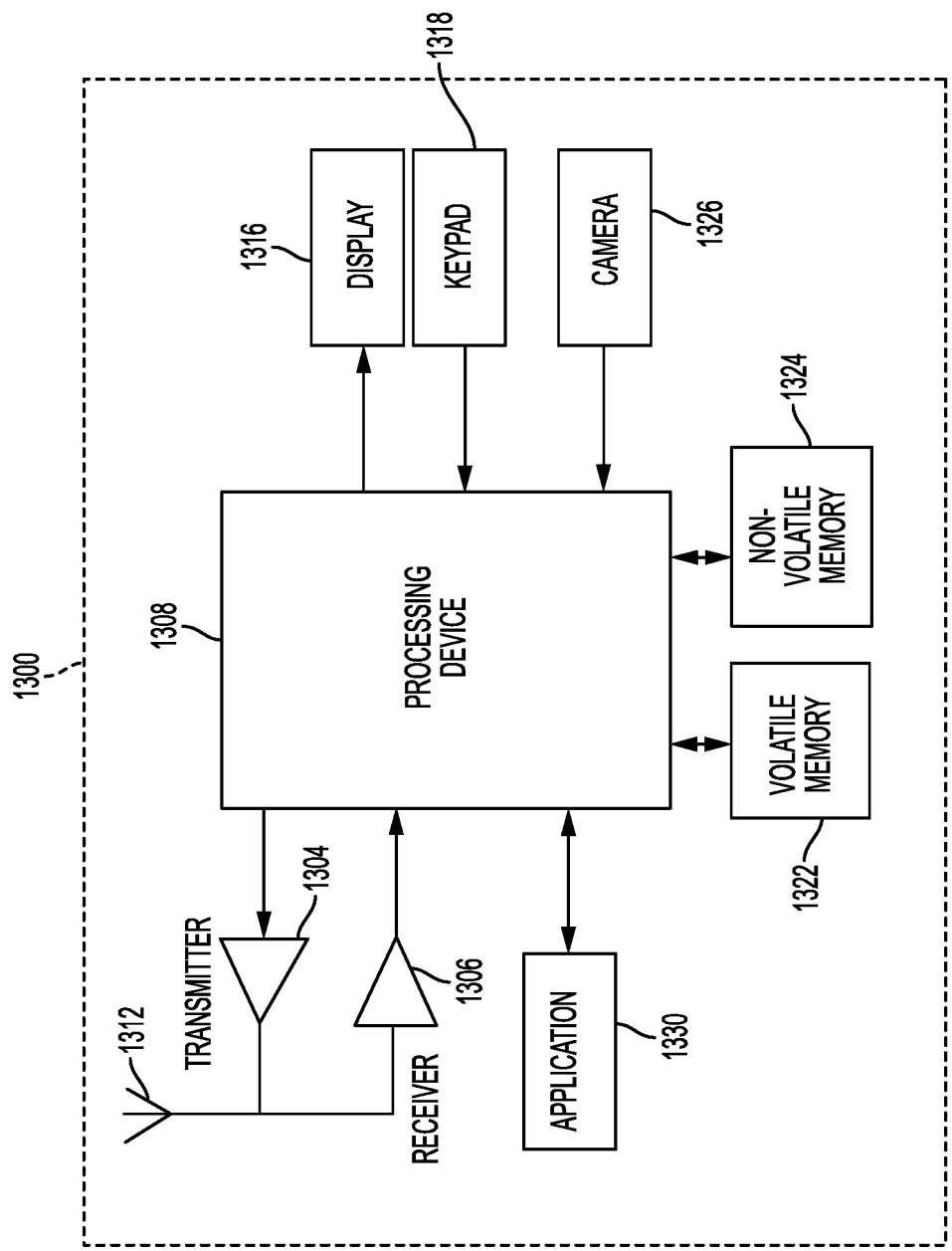
FIG. 4B is a schematic block diagram of an exemplary mobile device 1300 according to various embodiments.

FIG. 4B provides an illustrative schematic representative of a mobile device 1300 that can be used in conjunction with various embodiments of the present invention. Mobile devices 1300 can be operated by various parties. As shown in FIG. 4B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

The invention is not limited to the above-described embodiments and many modifications are possible within the scope of the following claims. Such modifications may, for example, involve using multiple sources of energy beam than the exemplified single electron beam.

That which is claimed:

1. An apparatus for forming a three-dimensional article through successively depositing individual layers of powder material that are fused together so as to form the article in a vacuum chamber, the apparatus comprising:
   an electron beam source emanating an electron beam for fusing the powder material in a build tank,
   a hollow construction positioned between the electron beam source and the build tank, the hollow construction having an upper opening and a lower opening, the lower opening surrounding a work table within the build tank and the upper opening being configured for receiving the electron beam;
   a control unit configured for:
      moving the hollow construction between a first position and a second position where the first and second positions are at different distances with respect to a top surface of a powder table arranged outside the build tank; and
      synchronising movement of a powder distributor for applying the individual layers of powder material on the work table with the movement of the hollow construction, such that the hollow construction is at the first position when at least one of fusing or heating the powder layer, and at the second position when the powder distributor is distributing the powder material for forming the individual layers which is to be fused for forming the three dimensional article, and
   a movable shielding means enclosing the work table, wherein the movable shielding means are movable between a first and a second position, and wherein the movable shielding means is lowered down into the powder table when in the first position and protruding from the powder table when in the second position, wherein the powder distributor is configured to only pass under the hollow construction when the hollow construction is in the second position.

2. The apparatus according to claim 1, wherein the lower opening arranged at a predetermined distance above the top surface of the powder table arranged outside the build tank when the hollow construction is in the first position.

3. The apparatus according to claim 1, further comprising means for lowering the work table so that the top surface of the powder layer in the build tank is arranged at a predetermined distance below the top surface of the powder table when the powder layer is fused in the build tank.

4. The apparatus according to claim 1, wherein the movable shielding means is a metal or ceramic collar.

5. The apparatus according to claim 4, wherein a thickness of the metal or ceramic collar is between 0.5 centimeter and 1 centimeter.

6. The apparatus according to claim 4, wherein a shape of the metal or ceramic collar is either circular or rectangular.

7. The apparatus according to claim 1, wherein the movable shield means are arranged so as to protrude inside or outside the hollow construction.

8. The apparatus according to claim 1, wherein the hollow construction is made of a metal material, a ceramic material, or a combination thereof.

9. The apparatus according to claim 1, wherein the movement of the hollow construction is triggered by the movement of the powder distributor so that as soon as the powder distributor is moving the hollow construction is set in the second position and when the powder distributor is standing still the hollow construction is set in the first position.

10. A method for forming a three-dimensional article through successively depositing individual layers of powder material that are fused together so as to form the article in a vacuum chamber, the method comprising the steps of:
   providing an electron beam source emanating an electron beam for fusing the powder material in a build tank;
   providing a movable hollow construction positioned between the electron beam source and the build tank and the hollow construction having an upper opening and a lower opening, wherein the lower opening is enclosing the a work table within the build tank and where the upper opening is arranged for receiving the electron beam;
   moving the hollow construction between a first position and a second position where the first and second positions are at different distances with respect to a top surface of a powder table; synchronising, via control unit, movement of a powder distributor for applying the individual layers of powder material on the work table with the movement of the hollow construction so that the hollow construction is at the first position when at least one of fusing or heating the powder layer with the electron beam, and at the second position when the powder distributor is distributing the powder material for forming the individual layers which is to be fused for forming the three-dimensional article; and allowing the powder distributor to pass under the hollow construction only when the hollow construction is in the second position; and
   providing a movable shielding means enclosing the work table, the movable shielding means being movable between a first and a second position, where the movable shielding means is lowered down into the powder table when in the first position and protruding from the powder table when in the second position.

11. The method according to claim 10, further comprising the step of arranging the lower opening at a predetermined distance above the top surface of the powder table when the hollow construction is in the first position.

12. The method according to claim 10, further comprising the step of lowering the work table so that the top surface of the powder layer in the build tank is a predetermined distance below the top surface of the powder table when fusing the powder layer in the build tank.

13. The method according to claim 10, wherein the movable shielding means is a metal collar or a ceramic collar.

14. The method according to claim 13, wherein a thickness of the metal or ceramic collar is between 0.5 centimeter and 1 centimeter.

15. The method according to claim 13, wherein a shape of the metal or ceramic collar is either circular or rectangular.

16. A computer program product comprising at least one non-transitory computer-readable storage medium having computer-readable program code portions embodied therein, the computer-readable program code portions comprising one or more executable portions configured for:

moving a hollow metal construction between a first position and a second position where the first and second positions are at different distances with respect to a top surface of a powder table;

synchronising the movement of a powder distributor for applying the individual layers of powder material on a work table with the movement of the hollow metal construction so that the hollow construction is at the first position when at least one of fusing or heating a powder layer, and at the second position when the powder distributor is distributing powder material for forming individual layers which are to be fused for forming a three-dimensional article; and moving a movable shielding means, which encloses the work table, between a first and a second position, such that the movable shielding means is lowered down into the powder table when in the first position and protrudes from the powder table when in the second position, wherein the one or more executable portions are further configured for detecting movement of the powder distributor, and wherein, upon detecting movement of the powder distributor movement of the hollow construction is triggered, such that as soon as the powder distributor is moving the hollow construction is set in the second position and when the powder distributor is standing still the hollow construction is set in the first position.

* * * * *